Sept. 1, 1959  W. GRABES  2,901,946
TURRET TYPE VERTICAL MILLING MACHINE
Filed Dec. 2, 1953  5 Sheets-Sheet 5
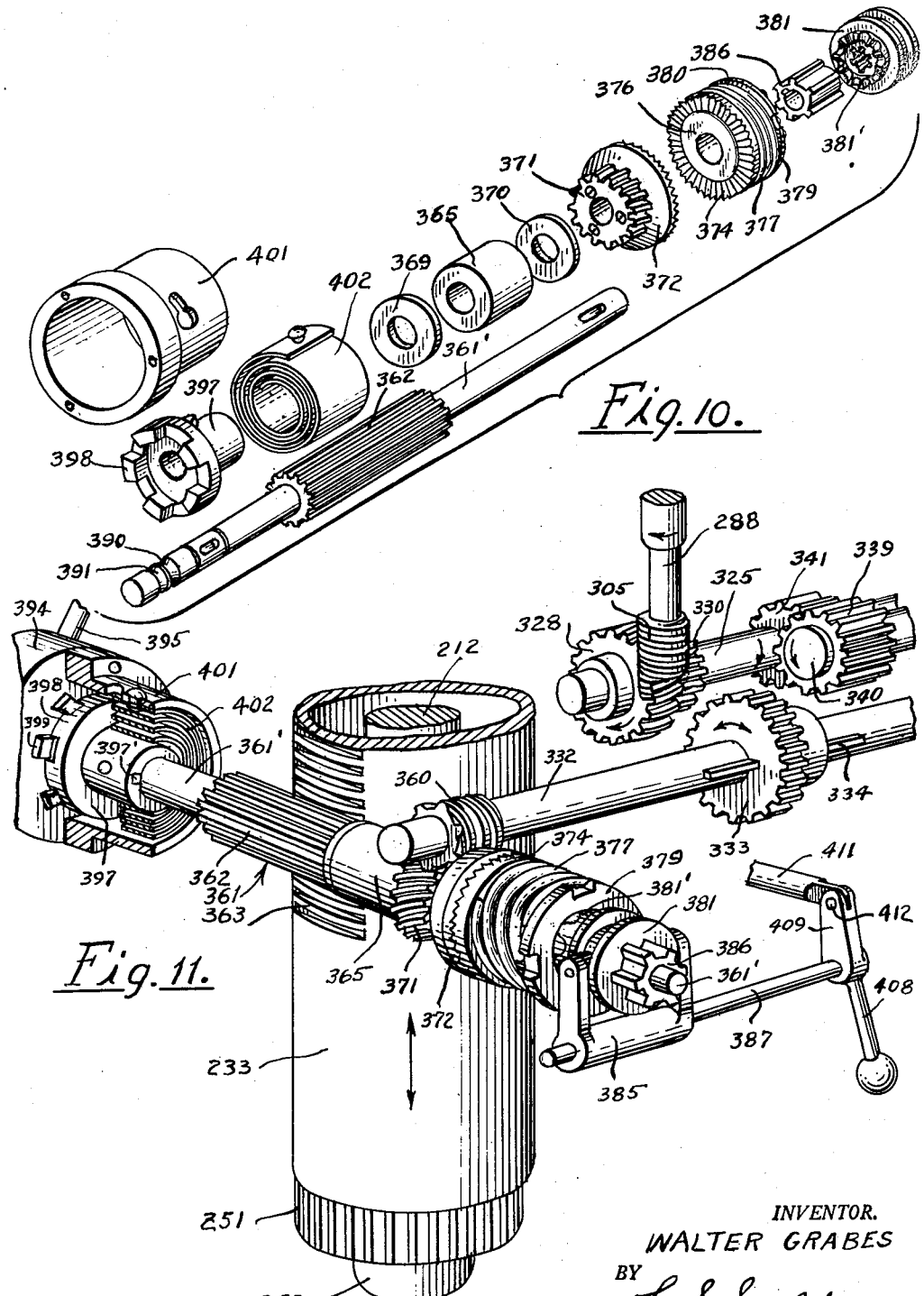
INVENTOR.
WALTER GRABES
BY
L. S. Saulsbury
ATTORNEY United States Patent Office 2,901,946
Patented Sept. 1, 1959

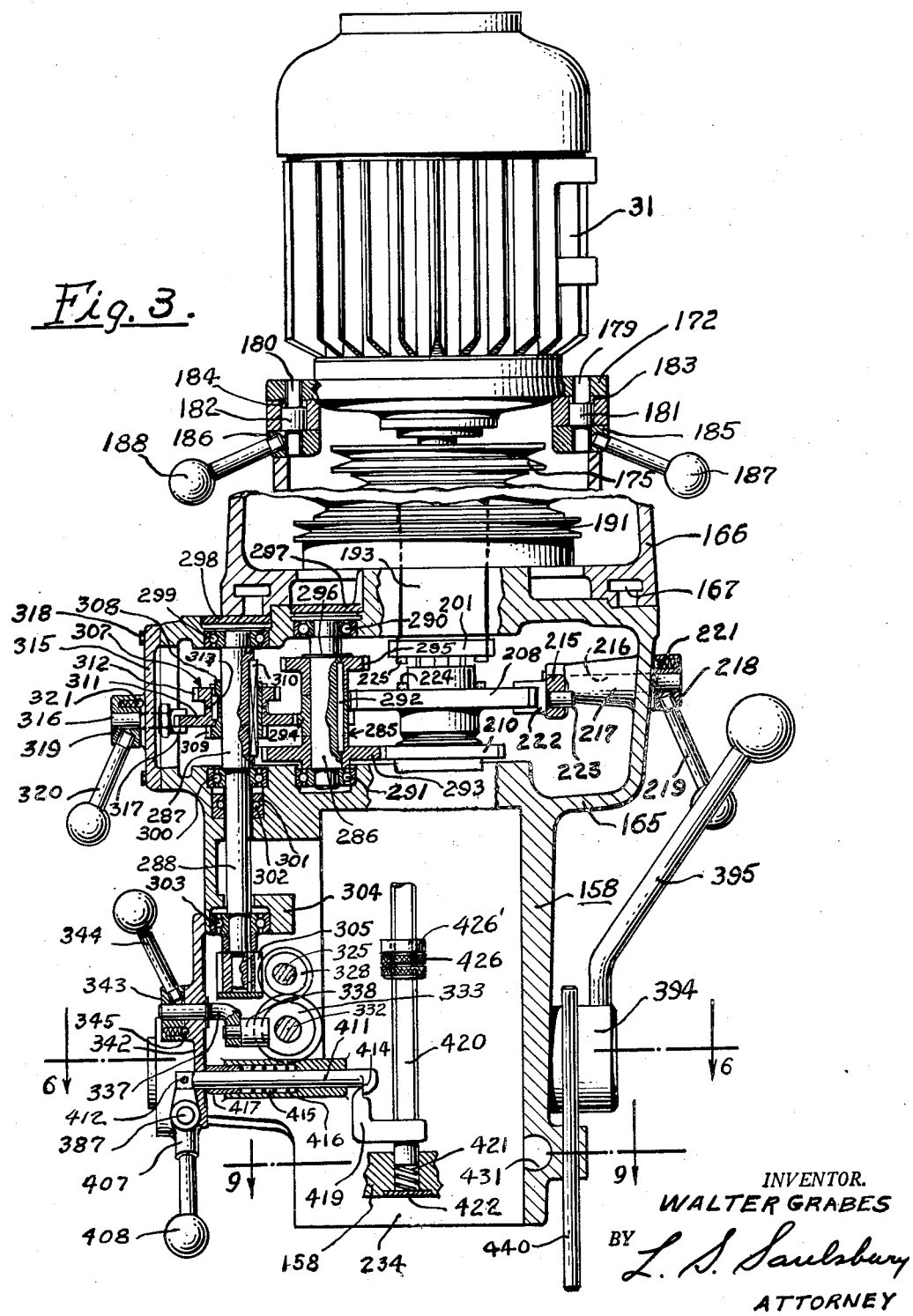

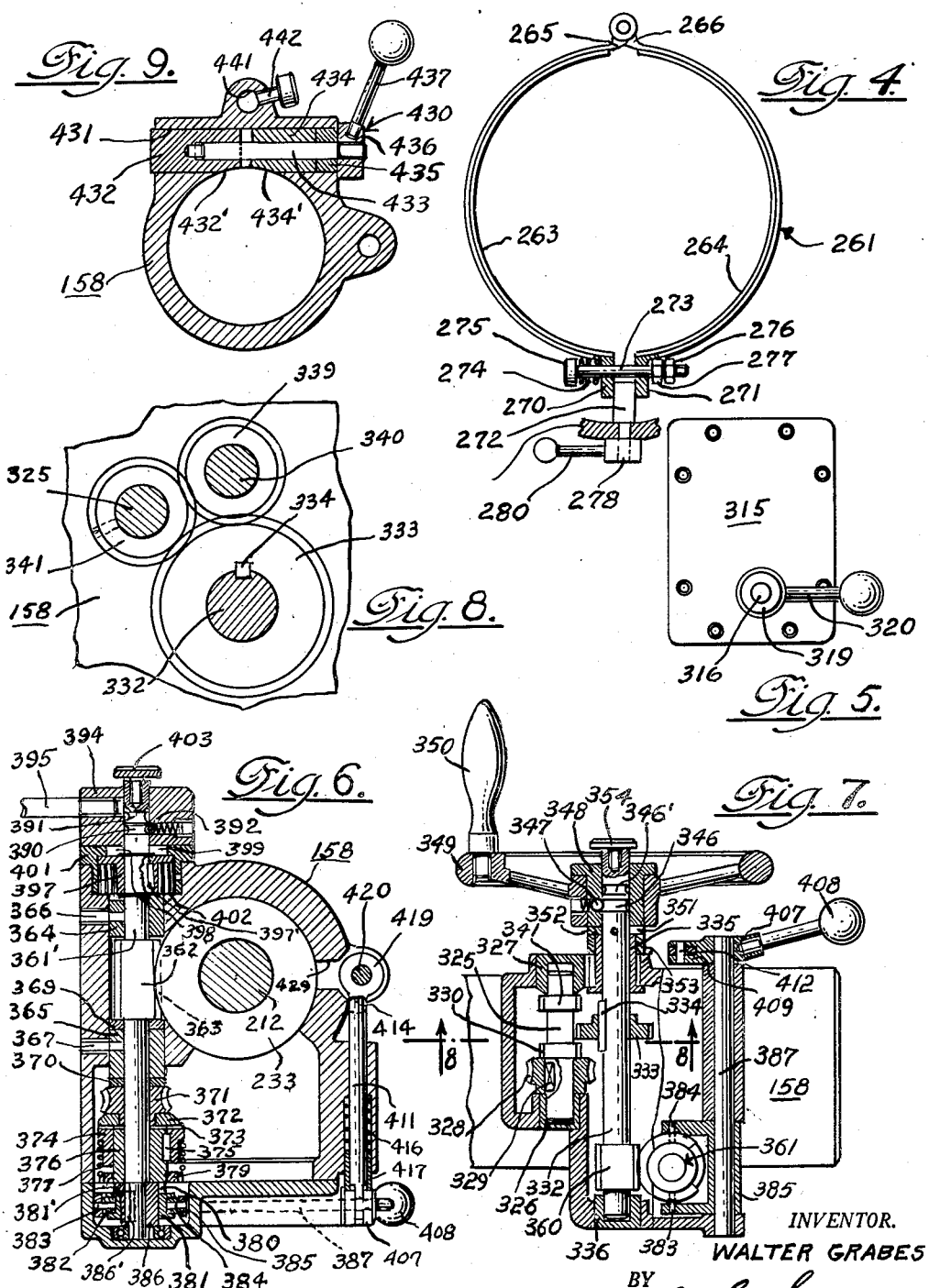

2,901,946

TURRET TYPE VERTICAL MILLING MACHINE

Walter Grabes, Monterey Park, Calif., assignor, by mesne assignments, to American Tool Engineering, Inc., Bellaire, Tex.

Application December 2, 1953, Serial No. 395,758

3 Claims. (Cl. 90—14)

This invention relates to a turret type vertical milling machine.

It is an object of the invention to provide a turret type vertical milling machine head having selective multi-speed power feed of the spindle and with an automatic drill depth release operable by an adjustable depth nut upon a threaded shaft and engageable by a projection extending from the quill to release and disengage the slip clutch of the spindle rack and pinion drive.

It is another object of the invention to provide a motor driven spindle head for turret type vertical milling machines wherein the motor bearing the drive pulley can be hinged to release the pulley belt and permit the easy placing of such pulley belt upon different pulleys and thereafter quickly returned to its operating position to tighten the belt whereby to make belt shifting easy and convenient upon the head.

It is another object of the invention to provide in a milling machine head a spindle brake adapted to clamp and hold the spindle shaft at times to slow down the spindle when the power is shut off when the collet is being attached to the lower end thereof whereby to save time in the working of the machine and fixing of the collet to the spindle shaft.

Other objects of the invention are to provide a milling machine which is simple in construction, easy to set up and adjust, versatile, rugged and adapted for heavy work, accurate, economical to run and maintain, low cost and efficient in operation.

Figure 1:
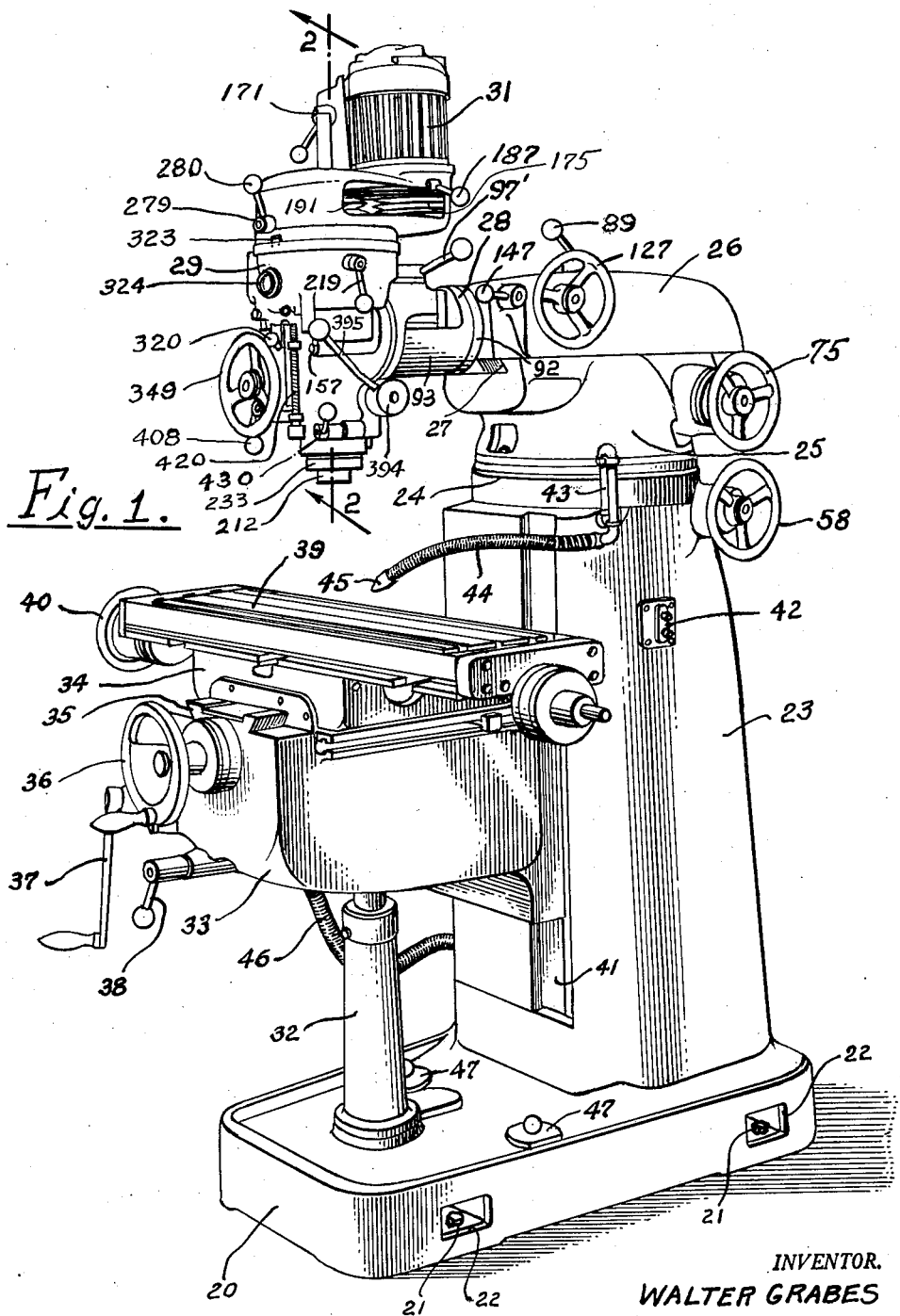
Figure 2:
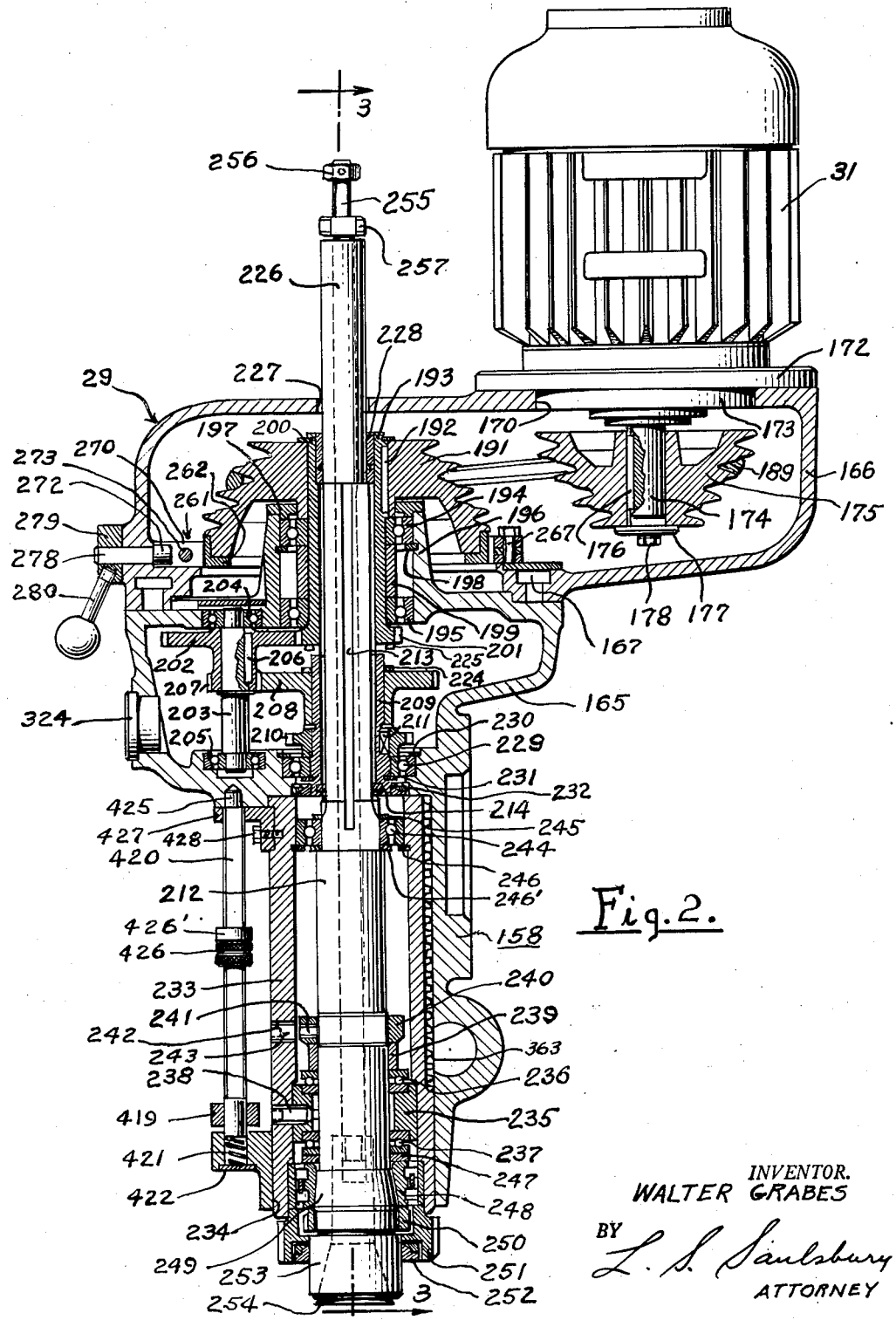

For other objects and for a better understanding of the invention, reference may be had to the following detailed description taken in connection with the accompanying drawing, in which Figure 1 is a perspective view of the turret type vertical milling machine of the present invention, Fig. 2 is an enlarged vertical sectional view taken through the spindle head and motor pulley drive, the view being taken generally on line 2—2 of Fig. 1, Fig. 3 is an enlarged vertical and fragmentary sectional view of the spindle head and through the chain speed mechanism for the power feed and the automatic kick out, the view being taken generally on line 3—3 of Fig. 2, Fig. 4 is a top plan view of the pulley brake mechanism with portions of the machine housing broken away, Fig. 5 is a front elevational view of the feed gear shift lever plate, Fig. 6 is a transverse sectional view taken through the worm feed drive mechanism for the spindle sleeve, the view being taken on transverse line 6—6 of Fig. 3, Fig. 7 is a fragmentary vertical and sectional view of the lower end of the spindle head showing the construction of the power and slow hand feed control gears for shifting between up and down feed of the spindle and the automatic release parts, Fig. 8 is a fragmentary sectional view taken on line 8—8 of Fig. 7.

Fig. 9 is a transverse sectional view showing the quill lock device, the view being taken on line 9—9 of Fig. 3, Fig. 10 is a perspective and exploded view of the rack pinion drive shaft and the slip clutch parts thereof, Fig. 11 is a fragmentary and skeletonized view of the drive and automatic release parts in the lower end of the spindle housing.

Referring now particularly to Figure 1, a general description will be made of the machine. This machine is installed upon a concrete foundation carefully prepared and leveled to insur the proper operation of the machine. The machine generally comprises a base portion 20 secured to the concrete foundation by bolts 21 accessible through openings 22 in the sides of the base portion 20. An integral upwardly-extending supporting portion 23 extends upwardly from the base portion 20. The upper end of the vertical portion 23 is machined to provide an annular way 24 on which a turret 25 is supported for rotation.

On the turret 25 is an over arm slide 26 that is adjustable horizontally with respect to the turret in a dovetail guide way 27, Fig. 1, in the turret. On one end of the slide 26 is a split swivel connection 28 that is rotatable upon a horizontal axis and which is also adjustable in a plane normal to the horizontal axis to permit adjustment of spindle head assembly 29 laterally to the left or right of the over arm slide 26. The spindle head 29 is also connected to the swivel connection 28 so that it can be rotatably adjusted thereon about a horizontal axis in a manner thereof as will be clearly set forth hereinafter. The spindle head assembly 29 carries a reversible electric motor 31 to supply power to the spindle and to the feed mechanism for operating the same.

The base portion 20 has a pedestal 32 lying forwardly of the upwardly-extending turret supporting portion 23 on which work holding table assembly 33 is supported. This table assembly is adjustable in the usual manner to adjust the work relative to the tool bit and on which the work is clamped in the usual manner. This table assembly has a top carriage 34 that is adjusted fore and aft upon dovetail projections 35 by a carriage cross travel hand wheel 36. The table assembly 33 is adjushed vertically by a lever 37 and is fixed in its adjusted position by a lock lever 38. Longitudinal travel of a top part 39 of the carriage 34 is effected by a longitudinal travel hand wheel 40. Portions of the table assembly 33 enter a vertical slot 41 in the vertically-extending supporting portion 23 to steady and accommodate the table assembly while being adjusted.

Within the vertical supporting portion 23 is a cooling liquid pump, not shown. This pump is run by electric motor which is controlled by a press button start and stop switch 42 on the side of the supporting portion 23 and the cooling fluid is delivered from a doubled pipe 43 extending out of the supporting portion 23 and on the lower end of which is a flexible goose neck delivery tube 44 having a nozzle end 45 that can be readily directed toward the cutting bit. The cooling liquid will be collected in the table structure 34 and returned to the pump through a flexible drain hose 46. Cooling liquid that collects on the base 20 may be returned to the pump by lifting drain covers 47. Since no claim of novelty is being made to the table structure or to the cooling fluid system, further description is not needed.

A detailed description will now be made of the spindle head assembly 29. The upper end of the spindle housing 158 is enlarged to contain gears thereby to provide a gear case portion 165 of the housing. A pulley housing 166 is mounted upon the gear case portion for angular adjustment with respect thereto. This pulley housing 166 has an annular T-slot 167 adapted to receive the heads of a plurality of T-bolts 168 that extend downwardly through the gear case portion 165 of the spindle housing 158 and on respectively secured nuts 168' to hold the pulley housing in its adjusted position, on top of the pulley housing is an enlarged opening 170 and above which is mounted the reversible motor 31 adapted to be supplied from an electric source and having a forward and reverse switch thereon, as indicated at 171. The motor 31 has a supporting plate 172 and a portion 173 depending therefrom that fits the opening with some play. A drive shaft 174 depends from the motor and extends into the pulley casing 166. To this shaft 174, there is keyed a pulley 175 having four V-grooves of different diameters. This pulley is keyed to the shaft 174 by a key 176 and is held against downward displacement by a retainer plate 177 and a securing bolt 178.

The motor plate 172 has depending studs 179 and 180 from opposite sides thereof that respectively have enlarged portions 181 and 182 that are adjustable respectively in openings 183 and 184 in the top of the pulley housing 166, at least one of the openings being arcuate in shape. Nuts 185 and 186 are adjustable upon the lower end of the studs to clamp the plate 172 against the top surface of the pulley housing 166. A ball handle arm 187 is provided on the nut 185 and a ball handle arm 188 is provided on the nut 186. By being able to shift or swing the motor 31 and the pulley 175 the pulley belt 189 is made free so that it can be easily placed in the desired groove. Once the belt 189 is in the groove the motor is shifted to tighten the belt to the proper tension. The belt 189 extends to a multiple groove spindle pulley 191 which is keyed by means of a key 192 to a vertically-extending sleeve 193 mounted for rotation about a vertical axis by upper and lower ball bearing units 194 and 195. These ball bearing units are contained in an upwardly-extending integral sleeve portion 196 on the top of the spindle housing 165. A retaining ring 197 covers the upper end of the sleeve portion 196. The ball bearing assembly 194 is held in the upper end of the sleeve portion 199 by a spring lock ring 198. A cylindrical spacer 199 is disposed between the bearing units 194 and 195. An upper lock ring 200 secures the pulley 191 against upward displacement from the upper end of the sleeve 193.

The lower end of the sleeve 193 has a gear formation 201 that meshes with a speed reduction gear 202 secured to a shaft 203 held for rotation in gear case portion 165 of the spindle housing 158 by ball bearing units 204 and 205. This gear 202 is keyed to the shaft 203 by a key 206 and has a small gear formation 207 that meshes with a vertically slidable gear 208 that is shiftable upon a bottom sleeve 209 to which a bottom gear 210 is secured by a key 211.

A spindle 212 is vertically movable through the head 29 and has grooves 213 to which bottom sleeve 209 is splined. The spindle 212 is driven by the bottom sleeve 209 and at a reduced speed when the slide gear 208 is in engagement with the gear 207. A wiping washer 214 carried by bottom sleeve has radial projections extending into the spindle grooves 213.

If direct drive of the spindle 212 is desired, the gear 208 is shifted by a crank 215, Fig. 3, having a shaft 216 journalled in an inwardly-extending boss projection 217 and extending outwardly through the enlarged gear case 169. A hub 218 is fixed to the shaft 216 outside of the casing and has a ball arm 219 by which the crank 215 can be turned. A spring ball detent 221 is provided in the hub 218 to hold the same in either of its adjusted positions. The crank 215 has a bifurcated swivel member 222 which has a spindle 223 rotatable in the crank arm 215 and which astraddles shiftable gear 208. Upon turning the crank 215 to move the gear 208 upwardly gear teeth 224 will mesh with gear teeth 225 on the upper sleeve gear 201. The slide gear 208 will be disengaged from the pinion gear 207 of the reduction speed gear and a direct drive connection will be effected between the upper and lower sleeves 193 and 209. The spindle shaft 212 will accordingly be driven directly from the pulley 191. It will be apparent that with four different size grooves on each of the pulleys that four different speeds will be obtained in direct drive and four different less speeds when the drive is effected through the reduction gear 202 and with the slide gear 208 in mesh with the gear pinion 207 of the gear 202.

The spindle 212 has a smooth upper end portion 226 and is slidable through a hole 227 in the top of the pulley housing 166. This smooth portion 226 is vertically slidable through a bushing 228 and is rotatable therein. The lower end of the bottom sleeve 209 is journalled for rotation by means of a ball bearing unit 229 held in place between split spring washers 230 and 231. A sealing means 232 surrounds the bottom sleeve 209 at its lower end to prevent leakage of oil from the gear case 165.

The spindle 212 is mounted for rotation in a quill sleeve 233 that is vertically slidable in the spindle housing 158. The quill 233 moves downwardly through a bottom opening 234 with the spindle 212 in the spindle housing 158. The mounting of the spindle in the quill 233 is effected by a vertical thrust bearing assembly 235 having upper and lower thrust bearing units 236 and 237 and secured to the quill 233 against vertical displacement by a set screw 238. Above the upper bearing unit 236 is a spacing sleeve 239 and a set collar 240 secured by a set screw 241 to the spindle. Access is had to the set screw 241 by registering the same with a hole 242 in the quill after removing a plug 243 therefrom. At the upper end of the quill, the spindle 212 is journalled to the quill by a ball bearing unit 244 held in place by upper and lower spring rings 245, 246 and 246'.

The lower thrust bearing 237 is supported on a washer 247 and an internally tapered double roller bearing assembly 248 is tightly fitted in the lower end of the quill 233 and engages a tapered portion 249 on the spindle 212. The bearing assembly 248 is held in place on the spindle by an internally threaded retaining ring 250 and in the quill 233 by an externally threaded retaining ring 251 having a packing gland 252.

The lower end of the spindle 212 is enlarged as indicated at 253 and is internally tapered to receive a tapered collet 254 to which a tool bit is secured. The collet 254 is made secure in the enlarged lower end of the spindle by a long draw bolt 255 that extends through the full length of the spindle and is threaded into the collet by turning upper end through fixed nut 256. The bolt 255 and collet is drawn upwardly through the spindle to finally secure the bit by lock nut 257.

In order to lock the spindle against rotation and so that the bolt 255 can be tightened by the nuts 256 and 257, a split brake band assembly 261, Figs. 2 and 4, is mounted upon the bottom of the pulley housing 166 and about the spindle pulley 191. On the lower end of the pulley 191 is an internal brake band 262 with which separable external brake band parts 263 and 264 may engage. These brake band parts 263 and 264 respectively have hinge projections 265 and 266 overlying one another that are hinged together and secured to the bottom of the pulley casing by a hinge pin 267.

The forward ends of the external parts 263 and 264 respectively have opposing projections 270 and 271 that are urged toward one another and against an operating cam 272. A bolt 273 extends through the projections and compression spring 274 surrounds the bolt and engages with the projection 270 of the part 263 and with head 275 of the bolt 273 to urge the projection 270 toward the projection 271. Lock nuts 276 and 277 are provided on the bolt and engage with the projection 271 to adjust the spring pressure. The cam 272 has an axle 278 that is journalled in the forward end of the pulley housing 166 and has a collar 279 and a ball lever arm 280 secured thereto. The external brake band parts 263 and 264 are normally held separated from one another by the cam 272 but upon turning the cam to its small width the projections 270 and 271 will be urged together by the compression spring 274 to set the external band parts 263 and 264 against the internal brake band 262 on the pulley 191. Thus, the spindle 212 will be locked against rotation so that the collet 254 can be secured to and fixed within the spindle shaft 212. Once the collet has been tightened, the cam 272 is then turned to its spreading position to hold the parts 263 and 264 separated from the band 262. The brake is also useful in slowing down the spindle upon completing a work operation.

A description will now be made of the power and hand feed mechanism. The gear 210 fixed to the bottom sleeve 209 drives a change speed gear assembly indicated generally at 285. This change speed gear assembly 285 comprises spaced vertical shafts 286 and 287 on which the gears are mounted and with the shaft 287 having a depending extension 288 for driving a release and rack pinion assembly in the lower end of the spindle housing.

The shaft 286 has its upper and lower ends respectively mounted in upper and lower ball bearing units 290 and 291 on the gear case 165. To this shaft there is keyed by means of key 292, three gears, namely a gear 293 that meshes with driving gear 210 on the lower sleeve 209, an intermediate gear 294 and an upper gear 295. These gears are held upon the shaft 286 and downwardly against ball bearing unit 291 and against upward displacement by a spring lock ring 296. A removable plate 297 covers an opening in the top of the gear case 165 through which the shaft 286 is mounted.

The shaft 287 is mounted through an opening in the top of the gear case 165 that is closed by cover plate 298. This shaft 287 is journalled in upper and lower ball bearing units 299 and 300. The extension 288 of the shaft 287 extends downwardly through a bushing 301 having a sealing ring 302 and is journalled at its lower end in a ball bearing unit 303 and keyed to the lower end of the shaft extension 288 is a driving pinion gear 305.

On the shaft 287 is a shiftable gear assembly 307 adapted to selectively engage any one of the gears 293, 294, or 295. This shiftable gear assembly 307 comprises an inner sleeve 308 having a gear formation 309 adapted to engage with gear 293. This sleeve 308 is keyed to the shaft 287 by a long key 310. Upon the sleeve 308 there is assembled an intermediate gear 311 and an upper gear 312 adapted to respectively engage intermediate gear 294 and upper gear 295 on the shaft 286. These gears 311 and 312 are keyed to the sleeve 308 by a key 313.

On the side of the gear case 165 is a cover plate 315, Figs. 3 and 5, that carries a gear shifter shaft 316 having a bifurcated portion 317 that astraddles gear 311. The plate 315 is secured in place on gear case 165 by screws 318. On the outer end of the shifter shaft 316 is fixed a hub 319 having a ball handle arm 320 extending outwardly therefrom. This hub has a spring ball detent 321 to hold the gear shift assembly 307 in any of its three selected speed feed positions or in a neutral position. These three selected gear positions respectively give a power feed travel of .0015, .003, and .006 inch per revolution of the spindle. The amount of vertical spindle travel is five and one-half inches and the maximum distance between spindle and table is eighteen inches thereby permitting an overall vertical travel of this distance.

The gear case 165 is supplied with oil by removing a plug 323, Fig. 1, on the upper part of the casing and the level of the oil in the gear case is observed through a window gauge fitting 324 in the lower part of the gear case 165, Figs. 1 and 2.

A description will now be made of the pinion and rack drive of the quill and the automatic depth release means of the spindle housing 158. Extending between opposite sides of the spindle housing is a shaft 325, Figs. 7 and 11, having its ends journalled respectively in bushings 326 and 327 lying in the housing 158. A worm gear 328 is secured by a key 329 to the shaft 325 and has a straight gear 330 integrally formed thereon and extending from one side thereof. The pinion gear 305 on the shaft extension 288 meshes with the worm gear 328 so as to turn the shaft 325. Lying below the shaft 325 is a hand wheel shaft 332 that has a slide gear 333 thereon that is splined to the shaft by a key 334. This shaft is journalled in a bushing 335 at one side of the housing 158 and in a bushing 336 at the other side thereof. This slide gear 333 is shifted by a crank 337, Fig. 3, having a bifurcated member 338 that astraddles the edge of the gear 333 to work the gear into either engagement with gear 330 on shaft 325 or with an idler gear 339 journalled on a stud shaft 340 on the inner face of the housing 158, Figs. 8, 9 and 11, that meshes with a gear 341 on shaft 325 whereby to give reverse rotation to the shaft 332 as when the spindle is to be lifted by power. The idler gear 339 is longer than gear 341 and projects to a greater extent outwardly from the inner face of the housing 158. Thus, the slide gear 333 will mesh with gear 339 without engaging gear 341.

The crank 337 is rotatably mounted in a cover plate 342 adjusted by a hub 343 and ball handle arm 344. A ball detent device 345 reacts between the hub 343 and the cover plate 342 to hold the slide gear 333 in either down feed, neutral or raise positions for the spindle.

The shaft 332 extends outwardly from the spindle housing and has two grooves 346 and 346′ on its outer end that are selectively engaged by a ball detent 347. This ball detent 347 lies in a hub 348 on a hand adjusting wheel 349 having a handle 350 thereon. The wheel 349 is axially adjustable between two positions represented by these grooves 346 and 346′. The hub 348 has clutch teeth 351 that engage with cooperating clutch teeth 352 of a member 353 which is journalled on the outer end of bushing 335 and is secured to the shaft 332. When the ball detent 347 is in engagement with the groove 346 the clutch teeth 351 and 352 are connected together so that the wheel 349 may serve to turn the shaft 332 by hand or will be turned by the shaft. If it is desired to have the wheel 349 disengaged or free from the shaft 332, it is pulled outwardly to locate the detent 347 in the groove 346′. An end stop bolt 354 holds the wheel 349 against displacement from the shaft 332. When slow hand feed adjustment is desired, the ball detent lies in the groove 346 and the crank arm 337 will be adjusted to locate the slide gear 333 in the neutral position, as shown in Fig. 5.

The shaft 332 has a pinion gear 360 that meshes with the rack pinion drive means indicated generally at 361, Figs. 6, 10 and 11. This drive means 361 comprises a shaft 361′ having a rack pinion 362 that meshes with gear teeth 363 on the quill 233. The shaft is journalled in bushings 364 and 365 respectively held in transverse opening 366 by set screws 367 and 368. The bushing 365 abuts a metal washer 369 lying adjacent to the end of the pinion 362. Another metal washer 370 lies on the opposite side of the bushing 365. Adjacent the washer 370 is a worm gear 371 having a slip clutch face portion 372 with radial face serrations 373 that match with a corresponding face on a cooperating slip clutch member 374. The slip clutch member 374 is keyed by means of a key 375 to a bushing 376. Surrounding the member 374 is a clutch spring 377 which is held thereupon by an adjustable retaining nut 379 threaded upon clutch bushing 376. This retaining nut 379 can be adjusted to give different spring tensions.

The bushing member 376 has clutch teeth 380 which may be engaged by corresponding teeth 381′ on a shiftable clutch member 381 having an external groove 382 with which opposing radial projections 383 and 384 of a bifurcated shifting arm 385 connects. The shiftable member 381 is shiftable upon an inner externally splined bushing 386 fixed to shaft 361' by key 386'.

The shifting arm 385 is fixed to a shaft 387. This shaft 387 when turned shifts the clutch member 381 between engaging and disengaging positions with the clutch teeth 381' in or out of engagement with teeth 380 on bushing 376. By means of a pinion gear 360 the rack pinion drive means 361 is connected with the power gearing. The slide gear 333 on shaft 332 having been adjusted upon engagement with either gears 341 or 339 will give rotation to the drive means 361 in either direction whereby to either lower or lift the spindle by power. If an obstruction is encountered, the slip clutch teeth 373 will ride over the clutch member 374 to disconnect the power drive.

On the opposite end of the shaft 361 there are provided two grooves 390 and 391 adapted to receive a ball detent 392. The ball detent 392 lies in a hub member 394 having a long handle arm 395 connected thereto and by which spindle 212 can be quickly adjusted for hand drilling operations or for fast lifting of the spindle.

Keyed to the shaft 361' is an inner sleeve member 397 as indicated at 397' having clutch teeth 398 on its outer face thereof adapted to engage with complimentary teeth 399 on a hub member 394. About the member 397 is an outer sleeve member 401 fixed by its flange and screws to the spindle housing 158. Connected between the inner and outer sleeve members is a spiral coil spring 402 which serves as a counterweight for the spindle assembly.

When the detent 392 lies in groove 390, the clutch teeth 399 of the hub 394 are locked with clutch teeth 398 of the inner sleeve 397' so that the lever 395 can turn the shaft 361' and the machine is thereby adapted for manual feed and lift. When detent 392 lies in groove 300, the hub 394 will be disengaged from the shaft 361' and the shaft can rotate free of the handle 395. A screw 403 holds the hub 394 against outward displacement from the drive shaft 361'.

The shaft 387 has a hub collar 407 with an operating arm 408 fixed to the opposite end thereof. The hub collar 407 has a short work arm 409 to which is connected a latch rod 411 by a pin 412. The rod has a shouldered head 414 and is slidable in a transverse opening 415 in the spindle housing 158. The opening 415 has a compression spring 416 therein, and the latch rod 411 has a collar 417 fixed thereto adapted to engage spring 416 and to compress the same when the rod 411 is thrust inwardly.

The head 414 of the latch rod 411 engages with a laterally and upwardly bent arm 419 that is fixed to a threaded depth gauge shaft 420 at its lower end thereof. The shaft 420 is supported at its lower end upon a compression spring 421 and a plate 422 in the lower end of the spindle housing 158, as shown in Figs. 2, and 3.

The upper end of the depth gauge shaft 420 is fixed in the bottom of the gear case portion 165 at 425, Fig. 2. Adjustable upon the threaded shaft 420 is a knurled adjusting nut 426 and washer 426' that can be adjusted to any location along the threaded shaft 420 depending upon the depth to which the work operation is to be extended. Upon the quill 233 is an arm projection 427 secured by a bolt 428 to the outer face of the quill and extending outwardly through a slot 429 in the housing 158. As the spindle is lowered, the arm 427 abuts the washer 426' and threaded nut 426 so as to depress the shaft and release the arm 419 from the shoulder 414 of the latch rod 411. The latch rod 411 will be moved outwardly by the action of spring 416 to pivot the lever and cause shaft 387 to be rotated and the clutch member 381 moved out of engagement with the clutch assembly in order to release the rack pinion drive means 361 to disconnect the same and stop the downward movement of the quill and spindle and arrest the work operation.

In order to lock the quill and spindle against movement at times when the feeding of the work to the tool is done with the work table 33, there is provided a clamp device indicated generally at 430, Fig. 9, that lies in a transverse opening 431 near the lower end of the spindle housing. This clamp device 430 includes a clamp part 432, into which bolt 433 is threaded. A clamp part 432 is relieved at 432' to conform to the surface of the quill. A cooperating clamp part 434 is similarly relieved at 434' to conform to the surface of the quill. These clamp parts are made of soft metal so as not to injure the quill surface. A hard metal collar 435 is provided in the opening 431 and serves as a stop for the part 434. The shaft 433 has a hub collar 436 secured thereto with a ball arm 437 attached thereto. As the hub collar is turned to tighten the screw 433 in the bolt 432, the relieved portions of the clamp parts will lock the quill against movement.

In order to have a gauge by which the head structure can be returned to the proper location and height above the work, a rod 440 may be adjusted to a setting within a vertical hole 441 and secured by a hand set screw 442 adjustable into engagement with the rod 440 to hold the same in its adjusted position.

It should also be apparent that different spindle speeds can be effected and that through a gear selector different spindle feed speeds can be had. Also, it will be apparent that there is automatic release mechanism for the rack and pinion drive to disconnect the movement of the spindle when the desired cutting depth has been effected and at times when an obstruction is encountered and at the end of the return movement of the spindle.

While various changes have been made in the detail construction, it shall be understood that such changes shall be within the spirit and scope of the present invention, as defined by the appended claims.

What is claimed is:

1. A spindle head structure comprising a spindle housing having an enclosed gear case, a drive sleeve journalled in said gear case, a motor-driven multi-speed drive mechanism mounted on said gear case and connected to said drive sleeve to drive the same, a quill vertically adjustable in said spindle housing, a spindle journaled in the quill and axially aligned with said drive sleeve, spindle reduction speed gears in said gear case, shiftable gear means on said spindle to selectively interpose said spindle reduction speed gears either between said drive sleeve and said spindle or to connect said spindle direct to said drive sleeve for direct drive, change speed feed gears in said gear case and adapted to be selectively connected to said spindle reduction gears to be driven thereby, so as to obtain multiple feed speeds for a given selected spindle speed, feed drive shaft means depending from said gear case, rack pinion drive gear means journalled in said housing and connected to said quill to adjust the same, manually shiftable reversing gear means connected between said feed drive shaft means and said rack pinion drive gear means and operable to supply power feed and return movement of said quill, said shiftable reversing gear means including a shaft geared to said rack pinion drive gear means, a shiftable gear on said shaft, reverse gears selectively engageable by said shiftable gear, said shiftable gear when not in engagement with either one of said reverse gears adapted to lie in a neutral position, hand means on said shaft for turning the shaft when said shiftable gear is in said neutral position to effect slow feed hand adjustment of said quill and spindle, and means on said spindle for securing thereto a working tool, whereby multiple spindle speeds and feed adjustment and power feed and return movement of said quill and spindle may be had.

2. A spindle head structure as defined in claim 1, and said rack pinion drive means having a releasable clutch device, an adjustable stop gauge means mounted on said spindle housing and adjustable to different feed depth positions and having a return stop, arm means carried by said quill and operable between the adjustable and return stops, said adjustable stop gauge means including latch stop set means operable upon engagement of said quill arm means with either said adjustable or return stops and connected with said releasable clutch device on said rack pinion gear means to release said clutch when either said adjustable stop or return stop have been engaged by said quill arm means whereby the movement of said quill may be automatically arrested.

3. A spindle head structure as defined in claim 2, and a fast manual operating lever carried on said rack pinion drive gear means for turning the same independently of said feed drive shaft and manually shiftable reversing gear means, spring return means connected between said spindle housing and said rack pinion gear drive means to return said quill to its elevated position upon release of the said fast manual operating lever, slip clutch means carried by said rack pinion drive gear means to permit slippage in the drive gear means upon said working tool encountering an obstruction.

References Cited in the file of this patent

UNITED STATES PATENTS

| | | |
|---|---|---|
| 426,588 | Hildreth | Apr. 29, 1890 |
| 884,529 | Seib et al. | Apr. 14, 1908 |
| 1,046,311 | Lassiter et al. | Dec. 3, 1912 |
| 1,063,665 | Dreses et al. | June 3, 1913 |
| 1,671,739 | Paca | May 29, 1928 |
| 1,971,299 | Fickett et al. | Aug. 21, 1934 |
| 2,013,492 | Gorton | Sept. 3, 1935 |
| 2,275,291 | Bannow | Mar. 3, 1942 |
| 2,269,064 | Rideout | June 6, 1942 |
| 2,296,573 | Richards | Sept. 22, 1942 |
| 2,392,035 | Fett | Jan. 1, 1946 |
| 2,449,773 | Hargreaves et al. | Sept. 21, 1948 |
| 2,491,940 | Tree | Dec. 20, 1949 |
| 2,604,019 | Malnar | July 22, 1952 |
| 2,641,970 | Plimmer | June 16, 1953 |

FOREIGN PATENTS

| | | |
|---|---|---|
| 3,744 | Great Britain | Sept. 9, 1915 |